Sept. 6, 1938.  E. L. ELWELL  2,128,992
MACHINE FOR PRODUCING FROZEN CONFECTIONS
Filed Nov. 2, 1935  3 Sheets-Sheet 1

INVENTOR.
Edwin L. Elwell
BY
Cox & Moore
ATTORNEYS.

Sept. 6, 1938.  E. L. ELWELL  2,128,992
MACHINE FOR PRODUCING FROZEN CONFECTIONS
Filed Nov. 2, 1935  3 Sheets-Sheet 2

INVENTOR.
Edwin L. Elwell
BY
Cox & Moore
ATTORNEYS.

Sept. 6, 1938.  E. L. ELWELL  2,128,992
MACHINE FOR PRODUCING FROZEN CONFECTIONS
Filed Nov. 2, 1935  3 Sheets-Sheet 3

INVENTOR.
Edwin L. Elwell
BY
Cox & Moore
ATTORNEYS.

Patented Sept. 6, 1938

2,128,992

UNITED STATES PATENT OFFICE 2,128,992

MACHINE FOR PRODUCING FROZEN CONFECTIONS

Edwin L. Elwell, Baltimore, Md., assignor to Eskimo Pie Corporation, Brooklyn, N. Y., a corporation of Delaware Application November 2, 1935, Serial No. 47,943

6 Claims. (Cl. 107—8)

This invention relates to a machine for inserting sticks into frozen confections, and has particularly to do with a machine for inserting sticks into frozen confections while the confections are in the molds in which they were previously frozen. The objects of the invention include among others the provision of a new and improved confection making machine, the provision of an unique means for providing a frozen confection with a stick or handle, the provision of a new and improved method of inserting stick handles into frozen confections, and the provision of a new and improved method of handling frozen confections and stick handles to be inserted therein.

These objects, and other objects which will hereinafter appear, are obtained by the new method and the unique arrangement, novel combination and improved construction of elements hereinafter described and claimed. A machine embodying one form of the invention and adapted for carrying out the new and improved method is illustrated in the accompanying three sheets of drawings, hereby made a part of this specification, and in which—

Like reference characters are used to designate similar parts in the drawings and in the following description.

The method of the present invention consists roughly of punching holes in a unitary group of previously frozen confections, arranging the proper number of suitable sticks or handles in a group, as for instance in a special holder or rack, in positions corresponding to the positions of the confections in the group, placing and orientating the group of sticks over the group of confections, and driving the sticks, preferably all at one time, into the confections. This method may be carried out by the use of the new and improved machine herein disclosed.

Figure 4:
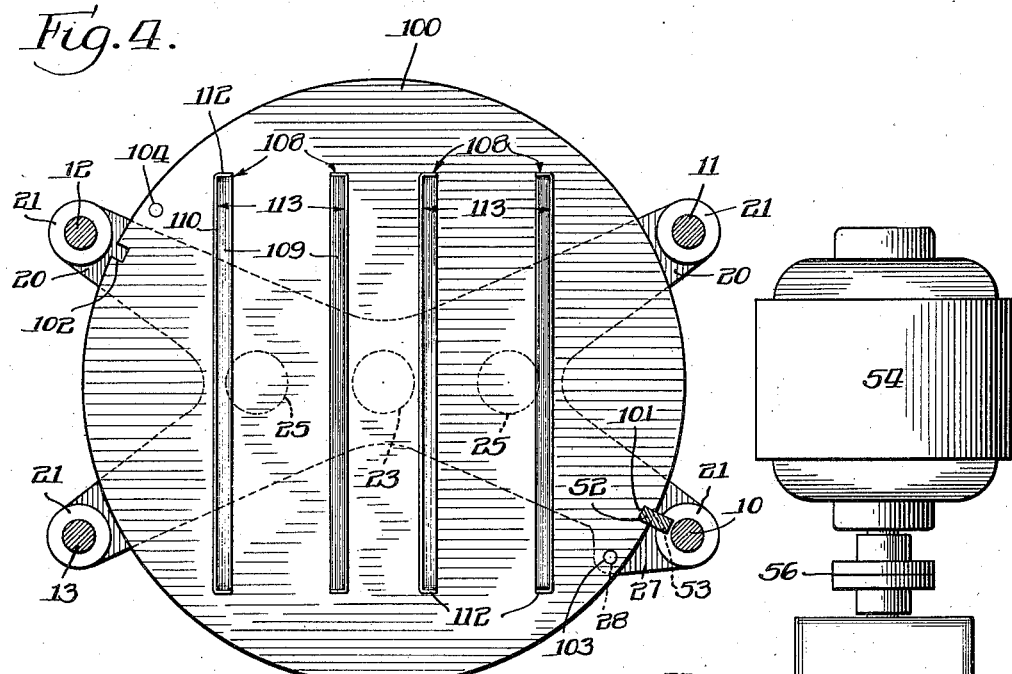
Figure 4 is a section of the machine on line 4—4 of Figure 1.

The foundation of the machine is a rigid frame consisting of four vertical posts 10, 11, 12 and 13, and two transverse members, 17 at the tops of the posts and 20 near the middle points of the posts. The transverse members hold the posts in rectangular arrangement as shown in Figure 4. The lower ends of the posts are reduced to fit within sockets 15 on feet 16. The upper reduced ends 14 of the posts are reduced and threaded and are held in apertured bosses 18 on the frame member 17, being secured there by nuts 19 threaded onto the reduced ends 14.

The frame member 20 is provided with bosses 21 which fit about the posts 10, 11, 12 and 13 and are secured thereon by pins 22.

The frame member 20 has on its under side a central boss 23 having an aperture 24 which extends through the frame 20. Two additional bosses 25 are located one at each side of the central boss 23. Each has an aperture 26 which extends through the frame 20. As shown in Figure 4, the frame 20 is enlarged at 27 and an aperture 28 is formed in the enlarged part.

Two side frame members 30 and 31 are provided with elongated bosses 32 apertured to fit about the posts 10, 11, 12 and 13. Frame member 30 is mounted on posts 12 and 13 near the lower ends thereof and frame member 31 is mounted on posts 10 and 11 in a corresponding position. Collars 29 on the posts hold the frame members at the selected position.

Semicircular bearing standards 33 are cast integrally with the frame members 30 and 31 to one side of the central line of the machine. A bearing cap 35 is attached to each bearing standard 33 by bolts or studs 34.

Figure 3:
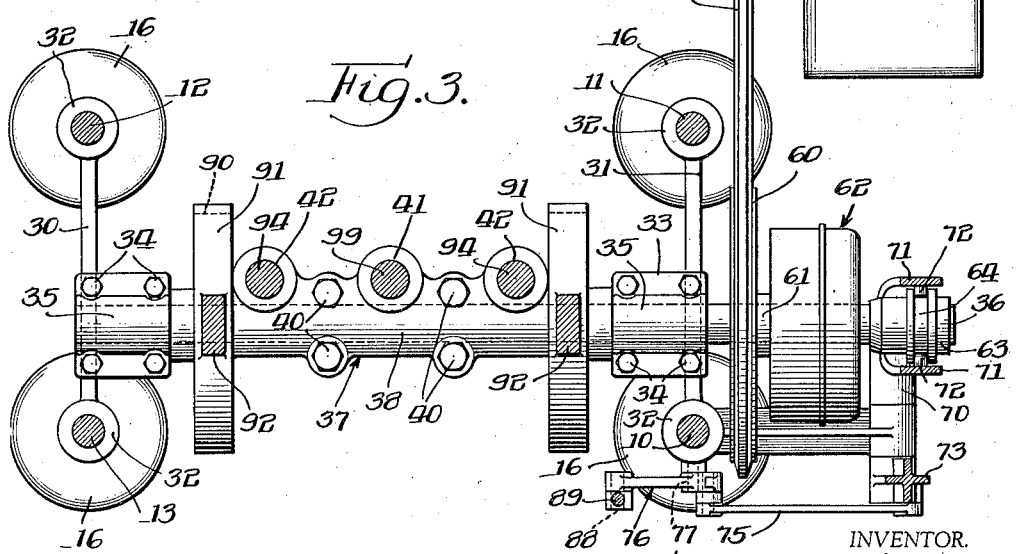
Figure 3 is a section of the machine of Figure 1 on the line 3—3 of Figure 1.

A shaft 36 is journaled in the bearing formed by the bearing standards 33 and the bearing caps 35. Shaft 36 extends to the right of the machine as shown in Figures 1 and 3 of the drawings.

The shaft 36 supports a split bearing block 37 midway between the frame members 30 and 31. Bearing block 37 extends to a short distance from the inside ends of the bearing standards 33 and comprises an upper block 38 and a lower block 39 clamped together about the shaft 36 by bolts 40. The bearing block 37 is provided with an aperture 41 in alignment with aperture 24 in frame member 20, and two apertures 42 one at each side of aperture 41 and in alignment with apertures 26 in frame member 20.

Figure 1:
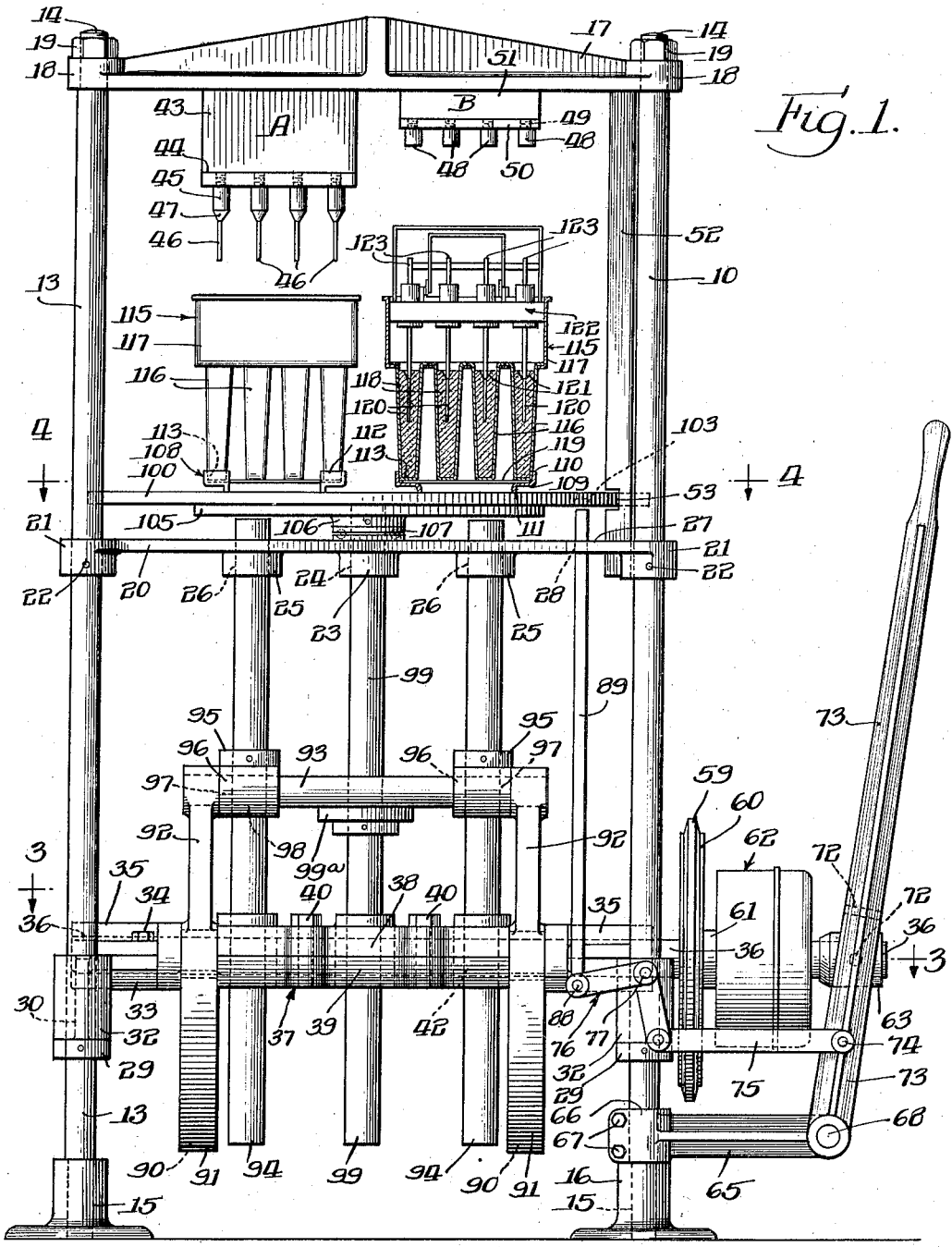
Figure 1 is a front elevation of a machine embodying and adapted for carrying out the invention.
Figure 2:
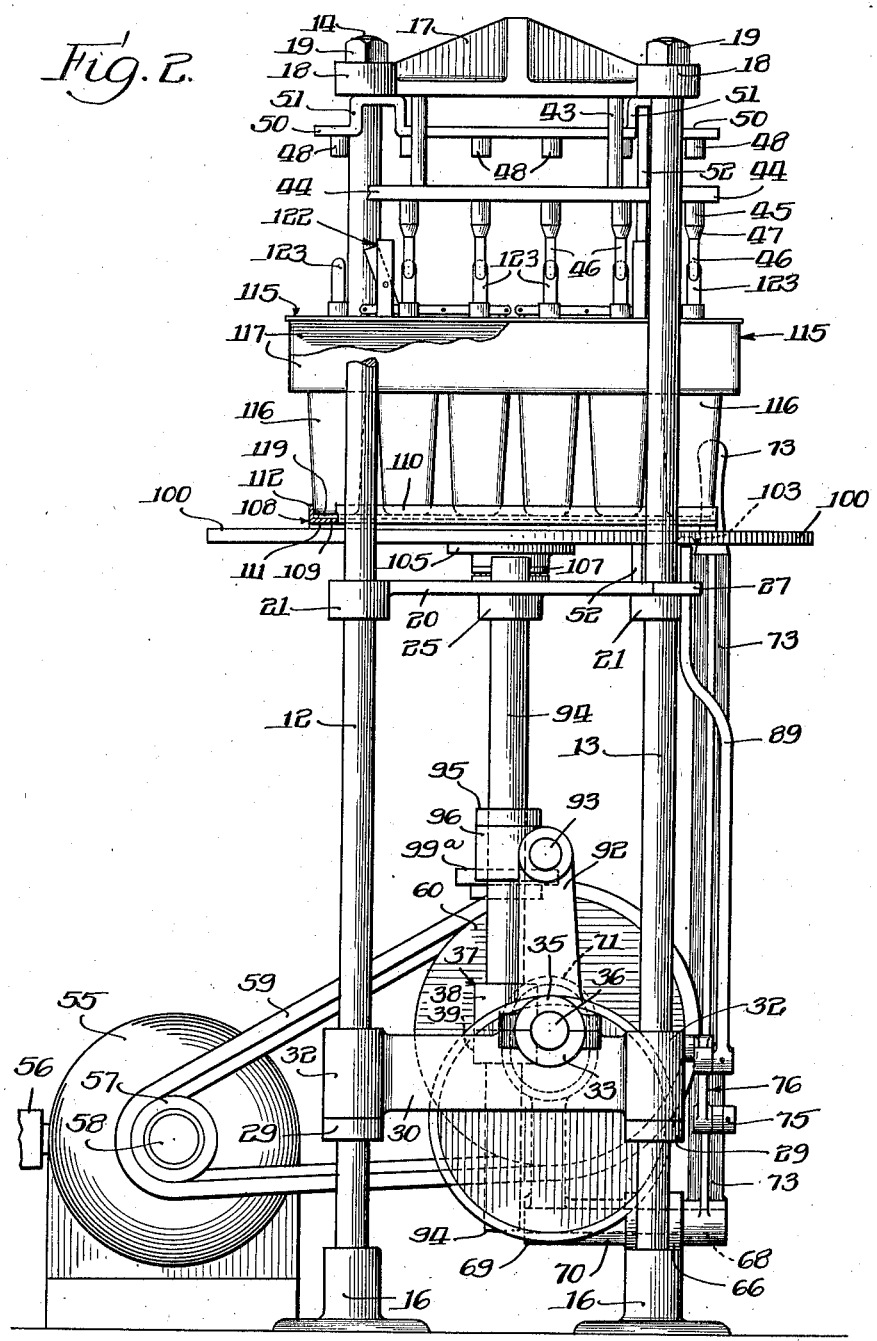
Figure 2 is a left hand side elevation of the machine shown in Figure 1.

Two stations A and B on the machine are indicated in Figure 1. The top transverse frame member 17 supports punches 46 at station A and blocks or stops 48 at station B. Stations A and B are diametrically across from one another in the machine.

At station A the punches 46 are supported by a head comprising vertical plates 43 secured to the frame member 17. A horizontal plate 44 is secured to the plates 43 and has tapped apertures to receive threaded studs 45 on punches 46. Each punch has a tapered shoulder 47 above the punch proper.

At station B, blocks 48 have threaded studs 49 which are screwed into a horizontal plate 50. The plate 50 has two transverse inverted U-shaped channels 51 to provide means for attachment to the frame member 17 and also to allow clearance for the two handles of a stick rack in its raised position, as will be later described. The blocks are of the same number as the punches and are in the same relative positions except that the positions are reversed.

A vertical guide bar 52 is located adjacent the vertical post 10 and parallel to the post. The bar 52 extends between the transverse frame member 17 and transverse frame member 20 and is provided near its lower end with a notch 53.

The driving means for the machine is shown in Figure 3 of the drawings. A motor 54 is coupled to a speed reducing gear box 55 by a coupling member 56. A grooved pulley 57 is keyed on a drive shaft 58 from the gear box 55. A belt 59 connects the pulley 57 to a pulley 60 keyed on a clutch sleeve 61. The clutch sleeve 61 rides freely on the shaft 36. A clutch 62 of the conventional type is mounted on the clutch sleeve 61. A clutch operating collar 63 is splined to shaft 36 and has a circumferential groove 64 to receive operating pins. The clutch operating mechanism is carried by an arm 65 which is secured to post 10 by a split boss 66 and locking bolts 67. The extended end of arm 65 is apertured to receive a shaft 68. A clutch operating arm 69 is keyed on one end of the shaft 68 and is spaced from the arm 65 by a collar 70. The free end of arm 69 is provided with a yoke 71 which encircles the collar 63. Pins 72 at the sides of the yoke 71 engage the groove 64 in the collar 63 to provide for movement of collar 63 on shaft 36 by means of arm 69 and yoke 71.

An operating lever 73 is keyed to shaft 68. One end of a link 75 is pivoted by the stud 74 to lever 73. The other end of the link is pivotally secured to the depending arm of a bell crank 76. The bell crank 76 is pivotally mounted on a stud 77 on the boss 32 about the post 10. An indexing rod 89 is pivoted to the horizontal arm of bell crank 76 by a pin 88 and extends vertically thereabove. The upper end of the rod 89 passes through the aperture 28 in frame member 20.

The shaft 36 carries a pair of eccentrics 90. One eccentric is adjacent each end of the bearing block 37. Circumferential straps 91 forming part of connecting rods 92 encompass the eccentrics 90. The ends of rods 92 are apertured to receive transverse rod 93.

Two vertical shafts 94 are reciprocally mounted in apertures 42 in the bearing blocks 37, and in apertures 26 in the frame member 20. Collars 95 are pinned on the shafts 94. Below collars 95 are blocks 96. Blocks 96 are provided with vertical apertures 97 to receive the shafts 94, and horizontal apertures 98 to receive the transverse rod 93.

A vertical central shaft 99 is reciprocally mounted in aperture 41 in the bearing block 37 and aperture 24 in frame member 20. A flanged collar 99a is pinned on the shaft 99 and engages the underside of cross shaft 93 to insure that shaft 99 lowers with transverse rod 93.

The upper end of shaft 99 supports a turntable 100 concentric with the shaft. The turntable is provided with diametrically opposed notches 101 and 102 (Figure 4) adapted to register with the guide bar 52 in sequence during periods of operation. The turntable 100 is also provided with apertures 103 and 104 which register in sequence with the upper end of the indexing rod 89 during periods of operation.

A rectangular reinforcing plate 105 is secured to the under side of the turntable 100 and is provided with a collar 106 pinned to the central shaft 99. A thrust bearing 107 is positioned about shaft 99 between the frame member 20 and the collar 106. The thrust bearing 107 remains adjacent the frame member 20 at all times.

Four parallel angle irons 108 are secured on the top of turntable 100 in any suitable manner. The angle irons 108 have a horizontal web 109 terminating in an upturned flange 110 and a depending flange 111. The ends of the webs 109 are turned up to form end flanges 112. The angle irons are in pairs forming two rectangular pockets 113, one pocket being located at each side of the center line of the turntable. The pockets 113 are adapted to receive confection molds 115. The upturned flanges 110 and 112 engage the sides and ends, respectively, of molds 115 and maintain them in position on the turntable.

The molds 115 comprise a plurality of individual confection pockets 116. The upper open ends of such pockets are anchored in a splash pan 117 and the lower ends are spaced apart and braced in their relative positions by strips 119 welded to the lower ends of the pockets.

Each rectangular pocket 113 is placed so that when the mold 115 is in position in it and the turntable correctly set at one or another of its two positions, each mold 115 will be at station A or station B and each confection pocket 116 directly under a punch 46 or a block 48.

In preparing frozen confections, the pockets 116 are filled to the desired level with a material to be frozen, and the material is solidified by chilling to form a frozen confection 118.

A mold 115 containing frozen confections is placed within the socket 113 on the turntable 100. The turntable 100 is turned around to bring the mold 115 directly under the punches at station A. The turntable in its lowermost position turns freely on thrust bearings 107, the edge of the turntable running through the notch 53 in the guide bar 52.

Driving power from the motor 54 through the gear box 55, belt 59, and pulleys 57 and 60 is delivered to the clutch 62. The clutch lever 73 is moved toward the machine to bring the clutch cone 63 into engagement with the clutch 62 and transmit the rotation from the clutch 62 to the shaft 36. Before the clutch is engaged the movement of lever 73 pushes the link 75 which rocks the bell crank 76 in a clockwise direction to raise the indexing rod 89. The upper end of the indexing rod 89 penetrates an aperture 103 or 104 in turntable 100 and holds the turntable in a position to align the mold 115 with the punches or knife blocks, bringing a notch 101 or 102 to a position in line with the guide bar 52 along which the notch must slide. Until the indexing rod 89 penetrates the aperture 103 the clutch cannot be engaged. After the clutch is engaged the indexing rod keeps the turntable in proper position until the notch 101 or 102 engages the guide bar 52.

Upon engagement of the clutch the turntable 100 is raised by the rotation of the eccentrics 90, on shaft 36, lifting the connecting rods 92. The transverse rod 93 carried by the connecting rods 92 forces the blocks 96 upwardly against the collars 95 pinned to reciprocating shafts 94. The upper ends of shafts 94 lift the plate 105 on turntable 100 forcing the turntable upward.

When the turntable 100 raises slightly the notch 101 or 102 engages the guide bar 52 and maintains the alignment of the molds 115 with the punches or blocks after the turntable has lifted above the end of the indexing rod 89.

Continued raising of the turntable 100 brings the confections 118 in the molds into engagement with the punches 46 and forces the confection thereupon. The upward movement of the turntable is continued until the top level of the confection has reached the broadest section of the tapered shoulders 47 of the punches 46. At this point the eccentrics 90 pass the highest center point and begin to rotate downwardly, lowering the transverse rod 93. The rod 93 bears against the flanged collar 99a pinned to the central shaft 99. The shaft 99 carries with it the turntable 100 and the mold 115. The punches 46 and shoulders 47 leave cavities 120 and throats 121 respectively, in the confections 118. If desired, suitable means may be provided to hold the mold in the pocket 113 as the turntable lowers.

When the turntable 100 reaches its lowermost position the lever 73 is moved out to disengage the clutch and to retract the indexing rod 89 from the turntable 100. The turntable 100 is then free to be turned about to bring the first mold 115 directly under the blocks 48 at station B. In this position the turntable presents the other aperture 103 or 104 over the indexing rod 89 and the other notch 101 or 102 in alignment with the guide bar 52.

A fresh mold 115 containing frozen confections is placed in the pocket 113 under the punches 46 at station A. A stick rack 122 with sticks or handles 123 in position therein is placed on top of the mold 115 at station B. The stick rack has been previously filled with sticks or handles by an operator, the sticks being placed in the sockets provided in the rack and being held in place by the mechanism of the rack. The sticks 123 in the stick rack are over the holes 120 previously punched in the confections by punches 46. The lowermost ends of the sticks 123 are guided by the throats 121 in the confection 108 into the narrow holes made by the punches 46.

With the two molds 115 in position under stations A and B the second stage of operation is begun by again engaging the clutch, the resulting action being identical with that of the first stage of operation.

The raising of the turntable 100 brings the sticks 123 at station B into engagement with blocks 48 where further upward motion of the sticks is arrested. Continued upward motion of the turntable 100 forces the confection 108 upon the sticks, the sticks being guided by the cavities 120. The sticks 123 are of a greater width and thickness than the cavities 120 and are driven into the confections past the ends of the cavities. The portion of the surface of the stick that is driven into the confection frictionally engages the confection into which it is driven so that a firm union between confection and stick results.

Simultaneously with the insertion of the sticks at station B, cavities are being formed in the confections contained in the mold at station A.

When the cavities have been formed in the confections at station A and the sticks are driven into the confections at station B the eccentrics reverse the travel of the turntable 100 and return it to its lowermost position. The mold 115 and the stick rack 122 at station B are removed as a unit from the machine when the turntable comes to rest in its lowermost position.

Subsequent operation of the machine is identical to the previous operation, namely, the mold from station A is swung around to a position under station B and a stick rack 122 previously filled with sticks is positioned therein. Secondly a fresh mold 115 containing frozen confections is positioned under station A and the machine is operated by throwing in the clutch lever 73.

The mold and stick rack removed from the machine may be carried as a unit to other departments where the confection is freed from the molds but adheres to the sticks in the rack. The stick rack 122 carries the sticks and the confection thereon and may be used for a dipping rack for applying a coating of chocolate or the like to the confection.

What is claimed as new and is desired to be secured by Letters Patent of the United States is:

1. A confection machine for use with a frozen confection mold and a stick rack, comprising a plurality of fixed punches in positions corresponding to the positions of confections in such mold, a table to receive such mold beneath said punches, means to lift said table to drive such confections onto said punches, such stick rack being seatable over said mold and carrying sticks positioned above the holes made in such confections by said punches, and a plurality of blocks fixed in positions away from said punches and corresponding to the positions of said punches, said table being movable to position such mold, rack, confections and sticks beneath said blocks, and said lifting means lifting such confections and sticks in such mold and rack to press said sticks against said blocks and drive said sticks into the holes in such confections.

2. A confection machine for use with a frozen confection mold and with a stick rack seatable on said mold and carrying sticks positioned over the confections in such mold, comprising a table to receive such mold, a plurality of punches, and a plurality of blocks spaced away from said punches, said punches and blocks being in positions corresponding to the positions of the confections in such mold, and means to lift said table to press such confections in such mold onto said punches and lower said table to remove the confections from said punches, the stick rack being seatable on the mold after the withdrawal of the confections from said punches, said table being movable to position said confections under said blocks, and said lifting means raising said table to press the sticks in the stick rack against said blocks and drive the sticks into the holes made by said punches.

3. The device described in claim 2 and in which said punches have a straight end portion and a tapered shoulder.

4. A confection machine comprising a rotatable table, means for indexing and guiding said table in a plurality of positions, means for lifting said table, a plurality of pockets on said table, a plurality of punches opposed to one of said pockets in each position of said table, and a plurality of blocks in positions corresponding to the positions of said punches and opposed to another of said pockets in each position of said table.

5. A confection machine comprising a rotatable table, means for lifting said table, manually operated means for actuating said lifting means, indexing means actuated by said manually operated means to index said table in a plurality of positions, guide means to maintain said table in such indexed position, a plurality of pockets on said table, a plurality of punches opposed to one of said pockets at each position of said table, and a plurality of stick driving blocks in positions corresponding to the positions of said punches and opposed to another of said pockets in each position of said table.

6. A confection machine for use with a source of power, comprising a rotatable table having apertures therein and notches at the edge thereof, rotary means for lifting said table, a manually operable clutch for actuating said rotary means, an indexing rod actuated coincident to the operation of said clutch to engage an aperture in said table and index said table in one of a plurality of positions, guide bars adapted to engage a notch in the edge of said table as said table is lifted in such indexed position, a plurality of pockets on said table and spaced thereon in correspondence with the plurality of indexed positions of said table, a plurality of punches opposed to one of said pockets at each position of said table, and a plurality of stick driving blocks in positions corresponding to the positions of said punches and opposed to another of said pockets in each position of said table.

EDWIN L. ELWELL.